(12) United States Patent  
Detounay

(10) Patent No.: US 6,863,941 B2  
(45) Date of Patent: Mar. 8, 2005

(54) AUTOMOBILE FUEL TANK

(75) Inventor: Patrick Detounay, Valmont (BE)

(73) Assignee: ATOFINA Research S.A., Feluy (BE)

( * ) Notice: Subject to any disclaimer, the term of this patent is extended or adjusted under 35 U.S.C. 154(b) by 21 days.

(21) Appl. No.: 10/350,659

(22) Filed: Jan. 24, 2003

(65) Prior Publication Data

US 2003/0124282 A1 Jul. 3, 2003

Related U.S. Application Data

(63) Continuation of application No. 09/597,364, filed on Jun. 19, 2000, now abandoned.

(30) Foreign Application Priority Data

Jun. 25, 1999 (BE) ............................................. 99112257

(51) Int. Cl.⁷ ..................... B29D 22/00; B29D 23/00; B32B 1/08; H05B 6/00; B28B 5/00
(52) U.S. Cl. ................ 428/35.7; 428/220; 428/500; 220/562; 264/478; 264/250; 264/328.1; 264/331.15
(58) Field of Search ............................. 264/528.1, 330, 264/331.11, 331.15, 478, 250, 297.1; 428/35.7, 36.9, 36.92, 332, 337, 339, 500, 188, 226; 220/562; 296/901.01

(56) References Cited

U.S. PATENT DOCUMENTS 4,384,987 A * 5/1983 Hawley ....................... 252/458
6,033,749 A * 3/2000 Hata et al. ................. 428/36.7

FOREIGN PATENT DOCUMENTS

GB 2176448 A * 12/1986 ............ B60K/15/00
WO 97/02294 * 1/1997 ............. C08F/4/64

* cited by examiner

Primary Examiner—Michael C. Miggins  
(74) Attorney, Agent, or Firm—William D. Jackson

(57) ABSTRACT

An automobile fuel tank comprising at least two components which have been joined together to form a tank having a wall defining a fuel chamber, at least one of the components being injection moulded and defining a part of the wall and composed of a polyethylene having a density of from 0.930 to 0.955 g/cm³, a dispersion index D of from 2 to 3 and a melt index $MI_2$ of from 0.2 to 2 g/10 min.

12 Claims, 1 Drawing Sheet

AUTOMOBILE FUEL TANK

This application is a continuation of application Ser. No. 09/597,364, filed Jun. 19, 2000 now abandoned.

BACKGROUND TO THE INVENTION

The present invention relates to an automobile fuel tank composed of polyethylene and to the manufacture of such a tank.

DESCRIPTION OF THE PRIOR ART

Automobile fuel tanks produced by blow moulding of high density polyethylene are known. One problem with the blow moulding of such automobile fuel tanks is that the blow moulding process imposes a restriction on the shape and dimensions of the tank which can be produced. In particular, the blow moulding process restricts the ability of pipes for receiving and outputting fuel into and from the tank to be integrally moulded with the tank body. Such pipes need to be welded onto the tank after the blow moulding process. This incurs additional cost and labour and the possibility of weld failure, leading to breakage of fuel or vapours from the tank.

Injection moulding is a known process for producing moulded plastics articles. While there would be a desire to use injection moulding for the production of automobile fuel tanks of polyethylene, nevertheless, to the applicant's knowledge there has to date been no technically and commercially acceptable process for producing automobile fuel tanks by injection moulding of polyethylene. Such a method would overcome the problem identified hereinabove concerning the restriction on the shape and dimensions of the moulded tank. There is thus a need for such a method of injection moulding a polyethylene automobile fuel tank.

Plastics automobile fuel tanks are required to exhibit high safety performance, particularly with regard to fire resistance and impact resistance. Such fuel tanks are required to meet minimum statutory industry specified performance criteria both with respect to creep resistance when the tank is subjected to a fire and crash test resistance when the tank is subjected to an impact. An automobile fuel tank for use in Europe is required to have a fire resistance and an impact resistance both complying with the respective standards defined in ECE34, ANNEX 5. In order to meet these standards, known blow moulded automobile fuel tanks are required by automobile manufacturers to have a minimum wall thickness of at least 3 mm so as to provide sufficient impact strength and creep resistance for the fuel tank as a whole. An automobile fuel tank composed of polyethylene typically has a volume of up to about 100 liters, or even greater. Given the requirement for such volumes in combination with the need for progressively lower wall thicknesses, this places a high demand on the planarity of the walls of the tank, both following manufacture and when used. Thus the walls of the fuel tank are required not to warp or shrink following the manufacture thereof, and are required to have a precisely defined shape and rigidity during use. There is a general desirability to reduce the weight of automobile components, correspondingly reducing the material cost of the fuel tank, and also the production costs, as a result of increased moulding time, whilst still meeting the minimum performance criteria. Such criteria require the tank when moulded to have walls which are planar and not subjected to warpage or shrinkage on moulding, which have good creep resistance and which have good impact resistance. There is a need in the art for a process for injection moulding a polyethylene automobile fuel tank meeting these additional criteria.

U.S. Pat. No. 4,719,135 discloses a blow moulded fuel tank having a polymer substrate, e.g. of HDPE, coated with a particular cured varnish agent. The tank is blow moulded. The HDPE has a density of from 0.935 to 0.950 g/cm$^3$ and an HLMI of less than about 10 g/10 min.

DE-A-3435992 discloses an extrusion blown fuel tank of HDPE, the HDPE also having a density of from 0.935 to 0.950 g/cm$^3$ and an HLMI of less than about 10 g/10 min.

EP-A-0834415 discloses an extrusion moulded multilayer plastic container such as a gasoline tank. A first layer comprises a polyethylene resin, a second layer comprises a modified ethylene polymer composition, and a third layer comprises a resin selected from saponification products of ethylene-vinyl acetate copolymer and polyamide resins.

SUMMARY OF THE INVENTION

It is thus an aim of the present invention to provide an injection moulded automobile fuel tank of polyethylene which at least partially meets the above-stated needs in the art.

Accordingly, the present invention provides an automobile fuel tank comprising at least two components which have been joined together to form a tank having a wall defining a fuel chamber, at least one of the components being injection moulded and defining a part of the wall and composed of a polyethylene having a density of from 0.930 to 0.955 g/cm$^3$, a dispersion index D of from 2 to 3 and a melt index $MI_2$ of from 0.2 to 2 g/10 min.

The polyethylene density following injection moulding is preferably from 0.934 to 0.955 g/cm$^3$.

Preferably, the polyethylene has a shear response of from 30 to 40.

The present invention also provides a process for producing a component for forming a wall of an automobile fuel tank, the process comprising injection moulding a polyethylene having a density of from 0.930 to 0.955 g/cm$^3$, a dispersion index D of from 2 to 3 and a melt index $MI_2$ of from 0.2 to 0.2 g/10 min to form the component.

The present invention yet further provides a process for producing an automobile fuel tank, the method comprising joining together two of the injection moulded components to provide a wall defining a fuel chamber.

In this specification, the density of the polyethylene is measured at 23° C. using the procedures of ASTM D 1505. The melt index $MI_2$ is measured using the procedures of ASTM D 1238 at 190° C. using a load of 2.16 kg. The high load melt index HLMI is measured using the procedures of ASTM D 1238 at 190° C. using a load of 21.6 kg.

The dispersion index D is the ratio Mw/Mn, where Mw is the average molecular weight of the polyethylene by weight and Mn is the average molecular weight of the polyethylene by number. The dispersion index D is the ratio Mz/Mw, where Mz is the molecular weight at the peak of the molecular weight distribution.

DETAILED DESCRIPTION OF THE PREFERRED EMBODIMENT

Figure 1:
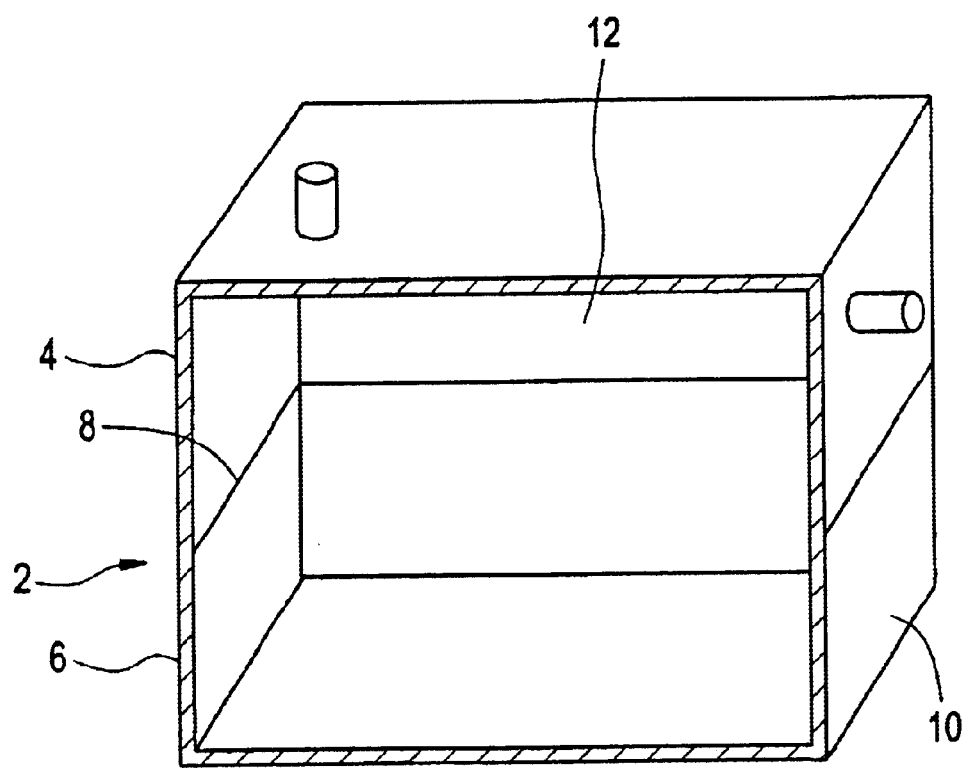
FIG. 1 is a schematic sectional view of an automobile fuel tank in accordance with a first embodiment of the present invention.

FIG. 1 shows, as a schematic representation, an automobile fuel tank, designated generally as 2, comprising at least two components, in this embodiment upper and lower tank halves 4,6 which have been joined together by a weld 8 to form the tank 2. The tank 2 thereby has a wall 10 provided by the tank halves 4,6 defining a fuel chamber 12. The thickness of the wall is exaggerated in FIG. 1 for the purpose of clarity of illustration. In this embodiment, both of the mould halves 4,6 have been formed by injection moulding. However, in alternative embodiments, only one of the components forming the automobile fuel tank is injection moulded. In other embodiments, the automobile fuel tank may be comprised of more than two components which have been joined together. The injection moulded component defines a part of the wall 10 and is composed of a polyethylene having a density of from 0.930 to 0.955 g/cm$^3$, a dispersion index D of from 2 to 3 and a melt index $MI_2$ of from 0.2 to 2 g/10 min. The polyethylene has a shear response of from 30 to 40. A more preferred density range for the polyethylene is from 0.934 to 0.955 g/cm$^3$.

The present invention is predicated on the surprising finding by the present inventor that by selecting a polyethylene having particular properties, in particular a particular density, a particular melt index and a particular molecular weight distribution, then in contrast to known processes components to form automobile fuel tanks can be injection moulded having large planar or substantially flat wall areas without warpage of the walls following injection moulding and having good creep resistance, rigidity and impact resistance yet also providing good injectability of the molten polyethylene resin during the injection process.

Most particularly, the present invention is predicated on the finding that by selecting a narrow range of the dispersion index (D) which represents the molecular weight distribution of the polyethylene resin, then a good compromise between avoiding warpage of the large surface area walls, yet retaining sufficient fluidity of the polyethylene resin when molten which is required for the injection process, can be achieved. If the dispersion index D is higher than 3, then as a result of the broad molecular weight distribution the polymer chains of varying length have different relaxation characteristics during cooling following the injection of the molten resin. This can induce warpage or shrinkage in the fuel tank wall following the injection moulding process. In accordance with the invention, the use of a polyethylene resin having a dispersion index D of no greater than 3 ensures that the narrower molecular weight distribution tends to reduce the distribution of the polymer chain lengths in the resin therefore rendering the relaxation of the polymer chains following injection moulding and on cooling to be more uniform, which leads to a more uniform solidification of the resin, thereby substantially avoiding warping and shrinkage of the injection moulded wall. If however, the dispersion index D is lower than 2, then the polyethylene resin would have insufficient fluidity when molten to be injectable in the injection moulding process. Within the dispersion index D range of from 2 to 3 employed by the present invention, the use of a lower dispersion index D within that range which leads to a progressively lower fluidity of the resin can be offset by the use of a higher melt index $MI_2$ for the resin. The melt index $MI_2$ can vary from 0.2 to 2 g/10 min and can be selected dependent upon the dispersion index D of the resin and on the size and geometry of the component being injected in the injection moulding process. The shear response SR, which is a ratio of the high load melt index $HLMI$/melt index $MI_2$, is preferably from 30 to 40. The shear response is an indicator of the processability of the polyethylene resin, in particular an indicator of the injectability and fluidity of the resin during the injection moulding process.

The polyethylene resin utilised in accordance with the invention to form the at least one injection moulded component of the automobile fuel tank has a density of from 0.930 to 0.955 g/cm$^3$. If following injection moulding the density is lower than 0.934 g/cm$^3$, then the creep resistance of the component may be insufficient for use in an automobile fuel tank. If the density is higher than 0.955 g/cm$^3$, then the wall component is too brittle, and thus the fuel tank has insufficient impact resistance and toughness.

The use of a polyethylene resin having a dispersion index D of from 2 to 3 requires the resin to have been produced using a single site catalyst. Such single site catalysts are well known to those skilled in the art. This produces a polyethylene resin have a monomodal molecular weight distribution.

In accordance with the invention, at least one component for an automobile fuel tank is produced by injection moulding the resin described above. Thereafter, two or more components are joined together, for example by welding, to form an entire fuel tank. Typically, each injection moulded polyethylene resin component comprises a fuel tank half and the two halves are welded together to form an entire fuel tank.

The use of an injection moulded process in accordance with the invention enables far more complicated geometric structures to be produced than using the known blow moulding process for producing automobile fuel tanks. The injection moulded components may incorporate integral pipes or other complicated geometric features.

The present invention will now be described in greater detail with reference to the following non-limiting Examples.

EXAMPLE 1

In this Example, a polyethylene resin having, before injection, a dispersion index D of 2.5, a density of 0.9300 g/cm$^3$ and an HLMI of 26.3 g/10 min and values of Mn, Mw, Mz, D and D' as specified in Table 1 was subjected to injection moulding at a temperature of 255° C. and the corresponding properties were again measured.

It may be seen from Table 1 that the polyethylene resin of Example 1 had both before and after injection substantially the same values for Mn, Mw and Mz. This was an indication that as a result of the relatively narrow dispersion index D there was substantially no disruption of the molecular weight distribution during the injection process. In particular the value of Mz did not significantly decrease following the injection processing, indicating that the chain distribution of the polyethylene resin as represented by the value Mz was not destroyed during the injection process. The value of the dispersion index D and also the value of the dispersion index D' were substantially unchanged as a result of the injection process at elevated temperature. The density and HLMI values were not significantly altered as a result of the injection process. This indicated that the injectability of the resin was maintained as a result of the dispersion index D employed, which represented a narrow molecular weight distribution. In combination therewith, the impact resistance of the resin following the injection process was not degraded. Table 1 also shows the impact resistance of the polyethylene resin both before and after injection when measured at a temperature of −40° C. This was in accordance with the procedures of ECE34, ANNEX 5. It may be seen that the total energy required to cause impact failure was not significantly decreased as a result of the polyethylene resin having been injection moulded.

Table 1 also indicates Theological properties of the polyethylene resin of Example 1 both before and after injection moulding. The viscosity and the modulus of the resin were measured by a dynamic torsional analysis. It was found that the rheological properties of the polyethylene resin both before and after injection were not significantly altered, reflecting the small change correspondingly present with respect to the molecular weight distribution between the resin before and after injection.

The rheological properties of the polyethylene resins were determined by a dynamic torsional analysis in which a sample of the resin heated to a temperature of 190° C. was squeezed between two correspondingly heated metal plates located in parallel and having a radius of around 25 mm with the resin material being squeezed to a thickness of from 1.5 to 2 mm between upper and lower plates. The plates were then relatively rotated at increasing frequency with an initial frequency of 0.1 radians/second, 0.01 radians/second for high molecular weight polyethylene, up to a final frequency of 500 radians/second. The bottom plate was rotated and the torque, angle and axle force transmitted to the top plate by the resin were measured. The material was subjected to a strain of 10% and throughout the test the force transmitted by the material from one plate to another was measured to yield a value of frequency Wc in radians per second (where Wc is related to the viscosity of the polymer resin and in turn is dependent on the value of Mn) and a modulus Gc (which represents the viscosity and elasticity of the polymer resin) as specified in Table 1.

The selection of the polyethylene resin in accordance with Example 1 shows that the use of the resin in accordance with the invention permits a good compromise between the maintenance of good impact resistance in the injection moulded resin article together with good Theological properties of the injection resin which tend to resist warpage and shrinkage of the injected article, as represented by the high level of viscosity for Example 1 of the injection moulded resin.

Comparative Examples 1 to 3

In these Comparative Examples, polyethylene resins having the properties specified in Table 1 and in particular having higher dispersion indexes D as compared to those required by the present invention, and also for Comparative Example 1 a higher density, were subjected to the same measurements both before and after injection at the respective temperatures indicated in Table 1 and the corresponding properties were measured as for Example 1.

It may be seen that while for Comparative Examples 1, 2 and 3, the impact resistance was substantially similar following injection moulding to that obtainable in accordance with Example 1, the rheological properties were significantly degraded following injection moulding, indicating a higher level of warpage and shrinkage of the polyethylene resins of the Comparative Examples after injection moulding. For Comparative Examples 1 to 3 there was following injection a significant decrease in at least the value of Mz, and for the value Mw for Comparative Examples 2 and 3, with corresponding decreases in the dispersion index D for those Comparative Examples. This indicates that for polyethylene resins having a relatively high dispersion index D, the breadth of the molecular weight distribution leads to disruption of the molecular weight distribution on processing by injection moulding in turn leading to disruption of the original polymer chain structure of the polyethylene resin as a result of injection moulding. This in turn leads, following injection moulding and cooling, to greater shrinkage and warpage than for polyethylene resins employed in accordance with the invention.

TABLE 1

| | Viscosity Crossoverpoint | | $M_n$ ($\times 10^3$) | $M_w$ ($\times 10^3$) | $M_z$ ($\times 10^3$) | | | Impact Resistance −40° C. | | | HLMI | Density |
|---|---|---|---|---|---|---|---|---|---|---|---|---|
| | Wc(rad/s) | Gc (Pa) | kDa | kDa | kDa | D | D' | peak E(J) | peak F (N) | total E(J) | (g/10 min) | (g/cm³) |
| Example 1 | | | | | | | | | | | | |
| Before Injection | 221 | 1.80E+05 | 32.4 | 81 | 152 | 2.5 | 1.9 | 19.5 | 3500 | 34.6 | 26.3 | 0.9300 |
| After Injection at 230° C. | 230 | 1.89E+05 | 32.6 | 80 | 145 | 2.4 | 1.8 | 16.4 | 3100 | 29.2 | 28.0 | 0.9353 |
| Comparative Example 1 | | | | | | | | | | | | |
| Before Injection | 38.2 | 4.39E+04 | 17.1 | 119 | 957 | 7.0 | 8.0 | 24.6 | 4000 | 42.8 | 49.8 | 0.9641 |
| After Injection at 255° C. | 18.3 | 3.37E+04 | 17.2 | 117 | 833 | 6.8 | 7.1 | 22.0 | 3800 | 34.2 | 47.1 | 0.9622 |
| Comparative Example 2 | | | | | | | | | | | | |
| Before Injection | 11.55 | 4.39E+04 | 16.8 | 188 | 1.656 | 11.2 | 8.8 | 23.3 | 4000 | 41.2 | 17.1 | 0.9432 |
| After Injection at 275° C. | 8.23 | 3.63E+04 | 16.6 | 159 | 1.060 | 9.6 | 6.7 | 16.8 | 3200 | 29.1 | 18.2 | 0.9432 |
| Comparative Example 3 | | | | | | | | | | | | |
| Before injection | 1.02 | 2.14E+04 | 16.7 | 266 | 2.507 | 15.8 | 9.4 | 24.9 | 4100 | 42.5 | 8.0 | 0.9540 |
| After Injection at 275° C. | 0.26 | 1.15E+04 | 17.0 | 206 | 1.451 | 12.1 | 7.0 | 17.5 | 3400 | 29.1 | 9.1 | 0.9536 |

What is claimed is:

1. An automobile fuel tank comprising at least two injection moulded components joined together to from a tank having a wall defining a fuel chamber, at least one of the components defining a part of the wall and composed of single site polyethylene having a monomodal molecular weight distribution shear response of from 30 to 40, a density of from 0.930 to 0.955 g/cm³, a dispersion index D of front 2 to 3 and a melt index $MI_2$ of from 0.2 to 2 g/10 min.

2. An automobile fuel tank as set forth in claim 1 wherein said at least one injection-moulded component incorporates an integral pipe integrally moulded with said at least one component.

3. An automobile fuel tank according to claim 1 which comprises two of the injection moulded components which have been joined together.

4. An automobile fuel tank according to claim 3 wherein the two injection moulded components comprise two tank halves which have been joined together by welding.

5. A process for producing a component which forms part of a wall of an automobile fuel tank, the process comprising injection moulding a polyethylene having a monomodal molecular weigh distribution and produced using a single site catalyst, the polyethylene having shear response of from 30 to 40, a density of from 9.30 to 0.955 g/cm3, a dispersion index D of from 2 to 3 and a melt index M12 of from 0.2 to 2 g/10 min to form the component wherein the wall of the automobile fuel tank is formed by joining at least two injection molded components.

6. A process according to claim 5 wherein the density of the polyethylene following injection moulding is from 0.934 to 0.955 g/cm3.

7. A process for producing an automobile fuel tank, the method comprising injection moulding a polyethylene having a monomodal molecular weight distribution and produced using a single site catalyst, the polyethylene having shear response of from 30 to 40, a density of from 0.930 to 0.955 g/cm3, a dispersion index D of from 2 to 3 and a melt index MI2 of from 0.2 to 2 g/10 min to form at least two components of the fuel tank, and joining together the at least two injection moulded components to provide a wall defining a fuel chamber.

8. A process according to claim 7 wherein at least two injection moulded components are together.

9. A process according to claim 7 wherein the density of the polyethylene following injection moulding is from 0.934 to 0.955 g/cm3.

10. A process for producing an automotive fuel tank, comprising:

(a) providing polyethylene having a monomodal molecular weight distribution and produced using a single site catalyst, the polyethylene having shear response of from 30 to 40, a density of from 0.930 to 0.955 g/cm3, a dispersion index D of from 2 to 3, and a melt index MI2 of from 0.2 to 2 g/10 min;

(b) injection moulding said polyethylene to form at least two components of the fuel tank wherein the density of the polyethylene following the injection moulding is from 0.934 to 0.955 g/cm3;

(c) joining together the at least two injection-moulded components to provide a wall defining a fuel chamber for said fuel tank.

11. A process according to claim 10 wherein at least one of said components is injection-moulded to incorporate an integral pipe integrally moulded with said at least one component.

12. A process for producing a component for an automotive fuel tank comprising:

(a) providing polyethylene having a monomodal molecular weight distribution and produced using a single site catalyst, the polyethylen having shear response of from 30 to 40, a density of from 0.930 to 0.955 g/cm$^3$, a dispersion index D of from 2 to 3, and a melt index MI$_2$ of from 0.2 to 2 g/10 min;

(b) injection moulding said polyethylene to form a component of the fuel tank incorporating an integral pipe in said fuel tank component;

(c) joining said injection-moulded component with at least one other fuel tank component to provide a wall defining a fuel chamber for said fuel tank.

* * * * *